United States Patent
Fomenkov et al.

(10) Patent No.: US 9,832,852 B1
(45) Date of Patent: Nov. 28, 2017

(54) EUV LPP SOURCE WITH DOSE CONTROL AND LASER STABILIZATION USING VARIABLE WIDTH LASER PULSES

(71) Applicant: ASML Netherlands B.V., Veldhoven (NL)

(72) Inventors: Igor V. Fomenkov, San Diego, CA (US); Robert Jay Rafac, Encinitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 15/343,768

(22) Filed: Nov. 4, 2016

(51) Int. Cl.
*G01J 1/42* (2006.01)
*H05G 2/00* (2006.01)
*H01S 3/23* (2006.01)
*H01S 3/11* (2006.01)
*H01S 3/107* (2006.01)
*H01S 3/223* (2006.01)

(52) U.S. Cl.
CPC ............ *H05G 2/006* (2013.01); *H05G 2/003* (2013.01); *H05G 2/008* (2013.01); *H01S 3/107* (2013.01); *H01S 3/11* (2013.01); *H01S 3/2232* (2013.01); *H01S 3/2308* (2013.01)

(58) Field of Classification Search
CPC ........... H05G 2/003; H05G 5/00; H05G 2/008
See application file for complete search history.

(56) References Cited

U.S. PATENT DOCUMENTS

| | | | |
|---|---|---|---|
| 6,855,943 B2* | 2/2005 | Shields | H05G 2/008 250/493.1 |
| 2002/0018288 A1* | 2/2002 | Rieger | H01S 3/0606 359/342 |
| 2004/0264512 A1 | 12/2004 | Hartlove et al. | |
| 2006/0138311 A1* | 6/2006 | Domke | G03F 7/70558 250/226 |
| 2007/0127007 A1 | 6/2007 | Cormont et al. | |
| 2008/0087840 A1 | 4/2008 | Ueno et al. | |

(Continued)

OTHER PUBLICATIONS

Parra et al., "X-ray and extreme ultraviolet emission induced by variable pulse-width irradiation of AR and Kr clusters and droplets," Nov. 2000, Physical Review B, Rapid Communications, vol. 62, No. 5, pp. R5931-R5934.*

*Primary Examiner* — Kiho Kim
(74) *Attorney, Agent, or Firm* — Gard & Kaslow LLP (57) ABSTRACT

A method and apparatus for control of a dose of extreme ultraviolet (EUV) radiation generated by a laser produced plasma (LPP) EUV light source. Each laser pulse is modulated to be of a width that is determined to be sufficient to allow for extraction of a suitable uniform amount of energy in the laser source gain medium; in some embodiments the suitable uniform amount of energy to be extracted may be selected to avoid self-lasing. The EUV energy created by each pulse is measured and total EUV energy created by the fired pulses determined, and a desired energy for the next pulse is determined based upon whether the total EUV energy is greater or less than a desired average EUV energy times the number of pulses. The energy of the next pulse is modulated, either by modulating its magnitude or by modulating the amplification of the pulse by one or more amplifiers, but without decreasing the determined width of the laser pulse.

21 Claims, 3 Drawing Sheets

(56) References Cited

U.S. PATENT DOCUMENTS

| | | | |
|---|---|---|---|
| 2008/0149862 A1* | 6/2008 | Hansson | H05G 2/003 250/504 R |
| 2009/0218521 A1* | 9/2009 | Sogard | G02B 1/06 250/504 R |
| 2013/0077073 A1 | 3/2013 | Van Schoot et al. | |
| 2013/0094529 A1 | 4/2013 | Wakabayashi | |
| 2014/0034852 A1 | 2/2014 | Kakizaki et al. | |
| 2014/0191132 A1* | 7/2014 | Schafgans | H05G 2/003 250/372 |
| 2014/0191133 A1* | 7/2014 | Crouch | H05G 2/003 250/372 |
| 2016/0147161 A1* | 5/2016 | Nikipelov | G02B 1/06 355/67 |
| 2017/0048959 A1* | 2/2017 | Riggs | H05G 2/008 |
| 2017/0181258 A1* | 6/2017 | Ershov | H05G 2/003 |

* cited by examiner

EUV LPP SOURCE WITH DOSE CONTROL AND LASER STABILIZATION USING VARIABLE WIDTH LASER PULSES

FIELD OF THE INVENTION

The present invention relates generally to laser produced plasma (LPP) extreme ultraviolet (EUV) light sources. More specifically, the invention relates to a method and apparatus for improving the control of a dose of EUV radiation generated by an LPP EUV light source to be applied to an item, such as a semiconductor wafer, being processed.

BACKGROUND OF THE INVENTION

The semiconductor industry continues to develop lithographic technologies that are able to print ever-smaller integrated circuit dimensions. Extreme ultraviolet ("EUV") light (also sometimes referred to as soft x-rays) is generally defined to be electromagnetic radiation having wavelengths of between about 5 and 120 nm. EUV lithography is currently generally considered to include EUV light at wavelengths in the range of about 10-14 nm, and is used to produce extremely small features, for example, sub-32 nm features, in substrates such as silicon wafers. These systems must be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or cluster of material having the desired line-emitting element, with a laser pulse at an irradiation site. The target material may contain the spectral line-emitting element in a pure form or alloy form, for example, an alloy that is a liquid at desired temperatures, or may be mixed or dispersed with another material such as a liquid.

In one common embodiment, a droplet generator heats the target material and extrudes the heated target material as a series of droplets that travel along a trajectory to the irradiation site to intersect a corresponding series of laser pulses. Ideally, the irradiation site is at one focal point of a reflective collector. When a laser pulse hits a droplet at the irradiation site, the droplet is vaporized and the reflective collector causes the resulting EUV light output to be maximized at another focal point of the collector. When subsequent droplets are hit with subsequent laser pulses, further EUV light output is provided.

LPP EUV systems are typically "MOPA" systems, in which a master oscillator and power amplifier form a source laser which may be fired as and when desired, and "MOPA PP" ("MOPA with pre-pulse") systems in which a droplet is sequentially illuminated by more than one light pulse. In a MOPA PP system, a "pre-pulse" is first used to heat, vaporize or ionize the droplet and generate a weak plasma, followed by a "main pulse" which converts most or all of the droplet material into a strong plasma to produce EUV light emission.

One issue is that it is desirable, and in fact important, to be able to control the amount, or "dose," of EUV light energy being applied to a particular item being treated, such as a semiconductor wafer. For example, a specified amount of EUV light energy may be required to accomplish some task, such as curing a layer of photoresist, on a semiconductor wafer as part of the manufacturing process. In order to obtain consistent results across different wafers, it will be desirable to apply the same amount of EUV light energy to each wafer, to as great a degree of accuracy as possible, and in a uniform manner.

This is complicated by the fact that the power in each laser pulse may vary. Since the amount of EUV energy released when a laser pulse hits a droplet varies with the power in the laser pulse, the EUV light energy generated by any given droplet may also vary.

At present there are two main ways that such dose control is accomplished in an EUV source. One is known as pulse control mode, and the other is called pulse modulation.

In pulse control mode, the laser pulses, and thus the corresponding droplets, are divided into "packets" or groups of pulses (and droplets). A packet may typically include 50 pulses, but packets of as few as 5 pulses, or even, in a modification known as distributed pulse control mode, a single pulse have also been used. A dose target is selected, which each packet is intended to meet.

The integrated EUV energy of a packet is controlled to achieve the dose target. The EUV energy generated by each pulse hitting a corresponding droplet is measured. For each packet, a total accumulated dose is then calculated by adding the energy from each droplet over the series of droplets, starting with the first droplet in the packet. Once the dose target for the packet is achieved, the rest of the pulses in that packet are "skipped" or "missed," i.e., droplets are not hit by the laser pulses. Skipping a droplet is typically accomplished either by firing the laser at a location other than the irradiation site at which the droplet is located, or by firing the laser at a time such that a droplet will not be at the irradiation site when the laser pulse arrives there.

One problem with some implementations of pulse control mode is that due to the variation in laser pulse energy, and thus in the EUV energy generated by each droplet, different packets may end up with very different numbers of pulses that actually generate energy. Any energy that might have been generated by a droplet that is skipped is wasted.

Since the pulses that do not generate EUV energy are all at the ends of the packets in early implementations of pulse control mode, there will be gaps between EUV pulse trains in sequential packets, and these gaps will also have a variable duration. In some cases, the target dose might be met by 10 droplets of a 15 droplet packet, with the remaining 5 droplets not hit, or 30 droplets of a 50 droplet packet, with the remaining 20 droplets not hit, resulting in gaps of 33% and 40% of the packet respectively. Still further, the moving average of EUV energy over time may have variations that are larger than desirable.

Even in later implementations of pulse control mode, there is a resolution limit, i.e., energy can only be controlled in the amount of the quantized energy contained in a single pulse. Further, the EUV energy created also heats up the EUV plasma, and the variation in the EUV energy in different pulse trains will thus cause the temperature of the plasma to also vary from packet to packet. This variation in temperature can lead to a less stable plasma and in turn cause further variations in the EUV pulse energy. As a result, a larger "dose margin," the difference between the maximum power that the system can theoretically produce and the amount of power that is desired, is required in order to insure that the dose target will be consistently met. The increased dose margin reduces the effective EUV power that can be achieved in the EUV source.

Some of these concerns, particularly related to large gaps between droplets being hit by pulses, are reduced in a modified form of pulse control mode that is described in pending U.S. patent application Ser. No. 14/975,436, which is commonly owned by the assignee of the present application.

Due to these issues, the pulse modulation approach to dose control is often used rather than pulse control mode. Pulse modulation attempts to avoid plasma instabilities by eliminating the gaps that occur in packet-based dose control. Instead of skipping droplets, the pulse energy of each laser pulse is controlled by adjusting either the duration of the pulse or the magnitude of the pulse from the master oscillator of the source laser, or the amount of amplification of that pulse by subsequent amplifier(s).

If the energy of each pulse can be adjusted sufficiently downward from its maximum energy, in theory no droplets need be missed, thus reducing wasted energy and requiring fewer pulses to reach a target dose, as well as reducing the variation in plasma temperature described above that can occur with pulse control mode and allowing for a smaller dose margin.

Adjustment of the pulse duration and magnitude from the source laser is accomplished by use of an actuator such as an electro-optic modulator (EOM), which typically adjusts the time duration of the pulse, also known as the "pulse width," to less, and often significantly less, than its natural or unaltered length, and/or an acousto-optic modulator (AOM), which can adjust the magnitude of the pulse to less than its natural magnitude. Adjustment of the amount of amplification of the pulse from the source laser is accomplished by applying radio frequency (RF) energy to the amplifier(s), which increases the energy in the carbon dioxide gain medium in the amplifier(s).

However, the pulse modulation approach is concerned with producing a uniform amount of EUV, and not with uniform extraction of gain, and thus has issues as well. One significant problem with the pulse modulation approach is that changes in the master oscillator pulse energy may lead to undesirable variations in the extraction of the gain in the power amplifier. For example, as is well known in the art, if the extraction of gain is insufficient, this can lead to self-lasing, which in turn can lead to uncontrolled energy extraction of the gain in the power amplifier, as well as large amounts of reflected power from the droplets that can damage optical components in the system. Additionally, reducing the laser energy hitting the droplet can produce increased amount of debris due to incomplete evaporation of the target, which is not desirable in the source.

In various situations, it may be helpful to have techniques and tools to control a dose of EUV radiation generated by an LPP EUV light source that more consistently extracts energy from the source laser than traditional pulse modulation.

SUMMARY OF THE INVENTION

Disclosed herein are a method and apparatus for improving the control of a dose of EUV radiation generated by an LPP EUV light source and to be applied to an item, such as a semiconductor wafer, being processed, while providing for extraction of a uniform amount of energy from the laser gain medium.

In one embodiment, a method is disclosed for controlling a dose of extreme ultraviolet (EUV) radiation generated by a laser produced plasma (LPP) EUV light source, the LPP EUV light source creating EUV energy by firing source laser pulses, a laser pulse having a pulse width corresponding to a nominal amount of laser energy in the pulse, and capable of hitting droplets of target material with a laser pulse, comprising: determining, by a controller, the width of a laser pulse necessary to extract a suitable uniform amount of energy from a source laser; receiving, by the controller, a selected EUV dose target and a number of laser pulses over which the dose target is to be achieved; determining, by the controller, a desired average EUV energy per laser pulse to be generated in order to achieve the dose target over the number of laser pulses; causing, by the controller, the light source to fire a laser pulse to hit a droplet; causing, by the controller, an actuator to modulate the width of the laser pulse to the necessary width; measuring, by a sensor, the EUV energy created by the laser pulse hitting the droplet; adding, by the controller, the measured EUV energy to a running total of the EUV energy generated by laser pulses that have been fired; determining, by the controller, a difference between the running total of the EUV dose and the desired average EUV energy per laser pulse times the number of laser pulses fired and, from the determined difference, a desired EUV energy to be generated by a next laser pulse; causing, by the controller, the actuator to modulate the pulse energy of the next laser pulse to the suitable pulse energy; and causing, by the controller, the light source to fire the next laser pulse to hit a subsequent droplet.

Another embodiment discloses a system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising: an actuator configured to modulate the energy of a laser pulse, the pulse energy corresponding to a nominal amount of EUV energy to be produced by the laser pulse; a sensor configured to measure the EUV energy created by a laser pulse hitting a droplet; a controller configured to: determine the width of a laser pulse necessary to extract a suitable and uniform amount of energy from a source laser; receive a selected EUV dose target and a number of laser pulses over which the dose target is to be achieved; determine a desired average EUV energy per pulse to be generated in order to achieve the dose target over the number of laser pulses; cause the light source to fire a laser pulse hit a droplet; cause the first actuator to modulate the width of the laser pulse to the necessary width; add the measured EUV energy created by each laser pulse to a running total of the EUV energy generated by laser pulses that have been fired; determine any difference between the running total of the EUV dose and the desired average EUV energy per pulse times the number of pulses fired and, from the determined difference, and a desired width for a next laser pulse; cause the actuator to modulate the pulse energy of the next laser pulse to the suitable pulse energy; and cause the light source to fire the next laser pulse to hit a subsequent droplet.

Still another embodiment discloses a non-transitory computer readable storage medium having embodied thereon instructions for causing a computing device to execute a method for controlling a dose of extreme ultraviolet (EUV) radiation generated by a laser produced plasma (LPP) EUV light source, the LPP EUV light source creating EUV energy by firing source laser pulses capable of hitting droplets of target material with a laser pulse, the method comprising: determining, by a controller, the width of a laser pulse necessary to extract a suitable uniform amount of energy from a source laser; receiving, by the controller, a selected EUV dose target and a number of laser pulses over which the dose target is to be achieved; determining, by the controller, a desired average EUV energy per laser pulse to be generated in order to achieve the dose target over the number of laser pulses; causing, by the controller, the light source to fire a laser pulse to hit a droplet; causing, by the controller, an actuator to modulate the width of the laser pulse to the necessary width; measuring, by a sensor, the EUV energy created by the laser pulse hitting the droplet; adding, by the controller, the measured EUV energy to a running total of the EUV energy generated by laser pulses that have been fired; determining, by the controller, a difference between the running total of the EUV dose and the desired average EUV energy per laser pulse times the number of laser pulses fired and, from the determined difference, a desired EUV energy to be generated by a next laser pulse; causing, by the controller, the actuator to modulate the pulse energy of the next laser pulse to the suitable pulse energy; and causing, by the controller, the light source to fire the next laser pulse to hit a subsequent droplet.

DETAILED DESCRIPTION OF THE INVENTION

The present application describes a method and apparatus for improving the control of a dose of EUV radiation generated by a laser produced plasma (LPP) extreme ultraviolet (EUV) light source and to be applied to an item, such as a semiconductor wafer, being processed, while providing for extraction of a uniform amount of energy from the laser gain medium.

In one embodiment, a variation of pulse control mode is used in which the duration of each pulse (also often called the pulse width) from the source laser is extended or lengthened, rather than shortened as in the prior art. A pulse width of extended duration is produced, for example, by an EOM, that will extract a portion of the energy from the power amplifier. The duration of the pulse width is selected so as to extract a suitable and uniform amount of the energy in the source laser gain medium (power amplifier) with each pulse. For example, in one embodiment the amount of energy extracted with each pulse is sufficient to prevent self-lasing. This can also allow the source laser to run at the highest possible pulse energy, and thus for the highest possible EUV energy to be produced. In the case of a MOPA PP system, in which a "pulse" includes a pre-pulse and a main pulse, it is the main pulse width that is lengthened; thus, use of the term "pulse" hereafter should be understood to refer to the main pulse in such systems.

In other embodiments, what is a suitable amount of energy to be extracted from the source laser gain medium may be based on considerations other than self-lasing. For example, it may be desirable to extract sufficient energy to maintain the thermal state of the beam path through the various components, to prevent thermal effects from causing misalignment of the system. In some embodiments, sufficient extraction of energy may allow the system to operate at a level close to the damage threshold of one or more components. In general, the extraction of energy from the source laser gain medium allows for a much broader range of dose targets with simple implementation than in the prior art, and may avoid the need for complex solutions such as injecting absorbing gas into the chamber, which requires additional gas and gas supply hardware. One of skill in the art will be able to determine which of the possible objectives of energy extraction are important, and the appropriate amount of energy that should be extracted to achieve those objectives.

As above, in the prior art it has been believed necessary to shorten the width of the pulse from the source laser in order to control pulse energy, and thus EUV energy, even given the risk of incomplete extraction of energy from the source laser and consequent self-lasing. It is generally thought that longer pulse from the source laser will result in more energy in the laser pulse, and thus more EUV energy generated by the pulse hitting a droplet.

In one embodiment, the present invention is implemented in a way that is counter-intuitive to the prior art in that the system does not shorten the pulse, but rather lengthens the pulse width to ensure uniform energy extraction with each pulse, and relies on other methods to reduce pulse energy or EUV energy when necessary. The pulse width may be as long as 100 to 200 nanoseconds (ns), rather than the 45 to 100 ns that is common in prior art pulse modulation, while in some embodiments the pulse width may be as short as about 30 ns. This works in some embodiments because the EUV generation from the later part of a laser pulse goes down to a very low level, and thus long laser pulses do not generate significantly more EUV energy than short ones, or at least not very much. Control of the overall dose may still be effected by use of the other methods of pulse modulation. One of skill in the art will appreciate that extraction of a uniform amount of energy may be detected by, for example, measuring the laser power between pulses, by looking for a reduction in the EUV energy produced that is not correlated to other instabilities in the system, or by deformation of the target material.

A dose target is selected to achieve a desired effect on the item being processed, and a number of pulses selected over which the dose target is to be created. From this, a desired average EUV energy to be generated by each laser pulse is determined in order to arrive at the selected dose target. The EUV energy created by each pulse is measured and a total EUV energy created by the pulses fired is determined. A desired EUV energy for the next pulse is determined so as to keep the total EUV energy created at or close to the desired average EUV energy times the number of pulses fired so far.

The next pulse, which again has a longer width to allow for full energy extraction from the source laser, is then modulated to provide a suitable pulse energy for the next droplet that will result in the desired EUV energy from the pulse hitting a droplet. Since the pulse width cannot be narrowed to modulate the pulse energy, the energy produced by the next pulse is modulated either by controlling the energy of the source pulse by modulating its amplitude, for example with an AOM, or by controlling the amplification of the pulse from the source laser by adjusting the amount of radio frequency (RF) power applied to each amplifier with an RF actuator.

The variation on pulse modulation in this embodiment can use the same energy sensor and controller for measuring produced EUV energy and determining the total energy produced by all pulses that is used in the prior art. However, different controller commands than those of the prior art may be needed to provide both pulse modulation and amplification according to the present invention.

Figure 1:
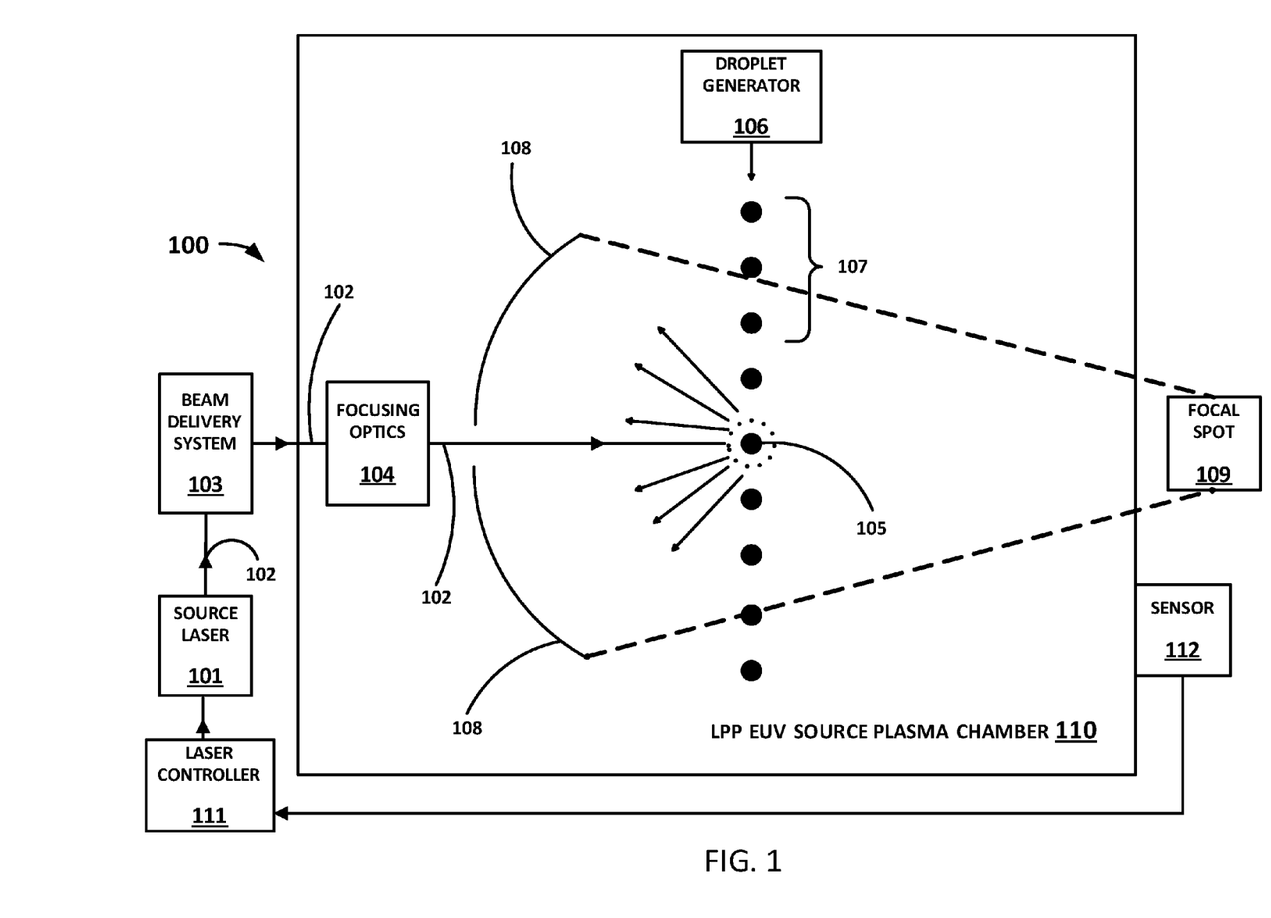
FIG. 1 is an illustration of some of the components of a typical embodiment of an LPP EUV system that may be used with prior art techniques as well as those described herein.

FIG. 1 illustrates a cross-section of some of the components of a typical LPP EUV system 100 as is known in the prior art. A source laser 101, such as a $CO_2$ laser, produces a laser beam, or typically a series of pulses, 102 that passes through a beam delivery system 103 and through focusing optics 104. As above, a MOPA source laser typically contain an amplifier; other amplifiers (not shown) that amplify the pulses from source laser 101 may be located between source laser 101 and beam delivery system 103. Focusing optics 104 may, for example, be comprised of one or more lenses or mirrors, and has a nominal focal spot at an irradiation site 105 within a plasma chamber 110. In some embodiments, there may be multiple source lasers 101, with beams that all converge on focusing optics 104.

A droplet generator 106 produces droplets 107 of an appropriate target material that, when hit by laser beam 102, produces a plasma which emits EUV light. In some embodiments, droplets may be produced, and laser pulses fired, at a rate of 50,000 per second (50 kilohertz, or 50 kHz).

Irradiation site 105 is preferably located at a focal spot of collector 108, which has a reflective interior surface and focuses the EUV light from the plasma at EUV focus 109, a second focal spot of collector 108. For example, the shape of collector 108 may comprise a portion of an ellipsoid. EUV focus 109 will typically be within a scanner (not shown) containing pods of wafers that are to be exposed to the EUV light, after it was processed by the scanner optic (not shown).

A laser controller 111 controls the firing of the source laser 101. In various embodiments of either packet-based dose control or pulse modulation, the laser controller 111 determines how to fire source laser 101 based upon data from a sensor 112, which measures the EUV energy generated by each pulse of source laser 101.

For example, in the packet-based dose control of the prior art, sensor 112 measures the EUV energy generated by each pulse and the accumulated EUV energy generated for the droplets in the packet is then calculated. If the target dose for a packet has been exceeded before all of the droplets in the packet have passed through irradiation site 105, laser controller 111 causes source laser 101 to fire at a time or times that does not correspond to the presence of droplets, or to fire in a direction other than irradiation site 105, in order to miss the remaining droplets in the packet. In such cases, laser controller 111 may send a signal to beam delivery system 103 and/or focusing optics 104 via a communication link (not shown) in order to do so.

Similarly, in the case of pulse modulation, sensor 112 measures the EUV energy generated and the accumulated total EUV energy is then calculated. In traditional pulse modulation, controller 111 may cause laser source 101 to fire a shortened pulse or one of reduced magnitude, or to apply less amplification than the maximum amplification of which the system is capable, based upon a determination of whether the average EUV energy per pulse is greater or less than the desired average EUV energy.

Alternatively, with changes to the logic or programming in laser controller 111, LPP EUV system 100 may also perform EUV dose control as described herein. While the laser pulse is not shortened in the present embodiment, as in traditional pulse modulation, if the delivered total dose meets or exceeds the desired average dose, laser controller 111 may cause source laser 101 to fire a next pulse of reduced power, or to amplify the next pulse by a lower amount than the maximum possible.

Determining when a target dose, i.e., the desired total EUV energy dose to be applied to an object, has been reached is typically accomplished by measuring the EUV energy generated when each pulse hits a droplet, and integrating the result to determine the total EUV energy generated so far; exposure of the object being treated is stopped when the desired dose target is reached. Thus, one way to arrive at a desired dose target is to divide the desired total EUV energy needed by some number of pulses, and then generate that number of pulses to create an appropriate average EUV energy per pulse so as to obtain the desired total.

Since the amount of EUV energy released when a laser pulse hits a droplet varies with the power in the laser pulse, the EUV light energy generated by any given droplet may also vary. For example, in some current EUV systems in which the laser source produces 50 watts of EUV power, the nominal EUV energy generated by each pulse is expected to be between 1.05 and 1.20 millijoules (mJ). At such energies, pulse counts in the range of 1000 to 5000 are common.

One approach would be to select a nominal EUV energy per pulse and then attempt to generate pulses that produce such EUV energy constantly until the overall dose target is reached. However, generating EUV energy is not so simple, due in part to the fact that the energy created by each laser pulse can vary significantly even under the best of conditions. As is known to those of skill in the art, the actual energy generated by a specific pulse striking a droplet will vary from the nominal EUV energy that is expected due to such things as variations in droplet size, the precise timing of the striking of the droplet by a laser pulse, and effects caused by the EUV plasma resulting from other droplets. In some systems, this will typically result in actual EUV energy values of from approximately 0.5 to 1.5 mJ per pulse, although the majority of pulses will create EUV energy that falls within the nominal range of 1.05 to 1.20 mJ.

As is known to those of skill in the art and further discussed below, typical EUV systems are run to generate pulses at less than the nominal maximum EUV energy per pulse. This difference is known as the "dose margin," which is the difference between the maximum power that the system can theoretically produce and the amount of power that is desired. For example, in the example above where the nominal maximum is 1.20 mJ per pulse, if the target EUV output is 1.05 mJ per pulse the dose margin is 12.5%, since 1.05 mJ is 87.5% of 1.20 mJ.

As above, in pulse control mode laser pulses are fired at droplets and the resulting EUV energy created by the pulses is measured and integrated until the dose target is met or exceeded, at which point subsequent pulses are caused to miss the droplets so no further EUV energy is created. However, also as above, this can result in large gaps during which no EUV energy is created, which in turn affects the uniformity and stability of the plasma, causing further undesirable variations to the uniformity of the EUV energy created.

As above, traditional pulse modulation attempts to fire at every droplet by adjusting the pulse duration and/or magnitude by use of an actuator such as an electro-optic modulator (EOM), an acousto-optic modulator (AOM), and/or an RF actuator to control the amount of energy in the laser pulse, and thus the amount of EUV energy that will be created when the laser pulse hits a droplet. In a system such as system 100 shown in FIG. 1, the EOM and AOM actuator(s) are typically located in the source laser 101, while the RF actuator is typically located where the amplifier(s) are located, i.e., either in the MOPA source laser or in between source laser 101 and beam delivery system 103, but in some embodiments it may be possible to locate them elsewhere in the system.

In traditional pulse modulation embodiments, the typical width that is applied to a pulse by an EOM or AOM is from about 40 nanoseconds (ns) to 100 nanoseconds; with this range of pulse width a typical EUV system might be able to produce pulses that nominally create EUV energy of 1.05 mJ to 1.20 mJ per pulse. In the present embodiment, with a source laser producing 50 watts of power, the width of a pulse is typically in the range of 100 to 200 ns; the nominal energy created by a pulse in the absence of other modulation will thus be about 1.20 mJ. One of skill in the art will appreciate that if a source laser produces more power, the energy per pulse will increase as well. Some systems may produce laser pulses with a typical width as short as 10 ns; in such a system, a pulse with extended width as described herein may be as short as 30 ns.

Figure 2:
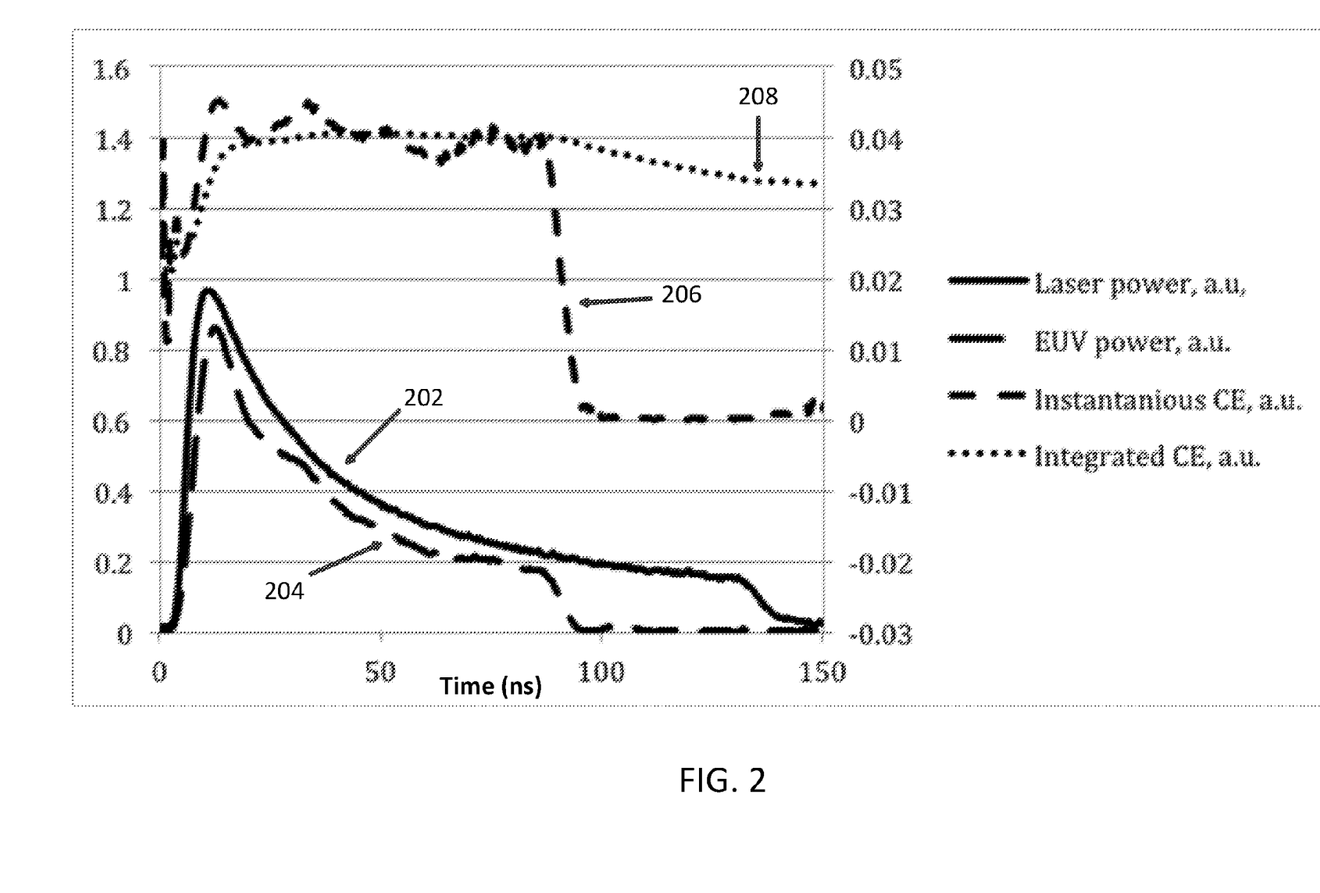
FIG. 2 is a graph showing various parameters of the typical operation of an LLP EUV system using pulse modulation according to one embodiment.

FIG. 2 is a graph showing the relationship of some of the values of an EUV LPP system operated according to the present embodiment. (The units other than time are arbitrary and not particular values.)

Curve 202 in FIG. 2 shows how the instantaneous power of a laser pulse varies with time in some systems. The pulse power initially increases rapidly as the gain medium of the source laser releases its energy, then peaks as the duration nears 20 ns, and tails off after that. As above, prior art systems typically produce laser pulses in the range of 45 to 100 ns. One of skill in the art will appreciate that most of the total power contained in the pulse has occurred by 100 ns, but again this may not be enough time to extract sufficient energy from the source laser to prevent self-lasing.

Curve 204 of FIG. 2 shows the instantaneous EUV power that is generated by the laser pulse of curve 202. As is apparent in FIG. 2, the EUV power peaks just after the pulse power peaks (due to the delay in the pulse hitting a droplet), and then similarly tails off. However, the EUV power drops to almost zero at about 90 ns, even though there is still some power in the laser pulse. It is for this reason that it is possible to use long laser pulses, as the extra width of the laser pulse does not increase the EUV power generated.

Curve 206 of FIG. 2 shows the instantaneous EUV conversion efficiency (CE) of a system operating as in the present embodiment. The EUV CE is defined as a ratio of the EUV energy to the laser pulse energy at the intermediate focus point (the industry standard definition uses the EUV energy emitted in 2 Pi steradian at 2% bandwidth). CE is usually expressed as a percentage, but again in the graph of FIG. 2 all of the values are in arbitrary units; in practice, the CE is typically around 4%. As would be expected from the instantaneous EUV power of curve 204, the instantaneous conversion efficiency stays level while there is significant EUV energy generated, and drops to close to zero at about 90 ns when the instantaneous EUV power drops to close to zero.

Curve 208 of FIG. 2 shows the integrated CE, which increases for about 20 ns as the instantaneous EUV energy increases rapidly, stays approximately level during the period that the instantaneous CE is significant, and then decreases slowly over time after the instantaneous CE goes to near zero.

Figure 3:
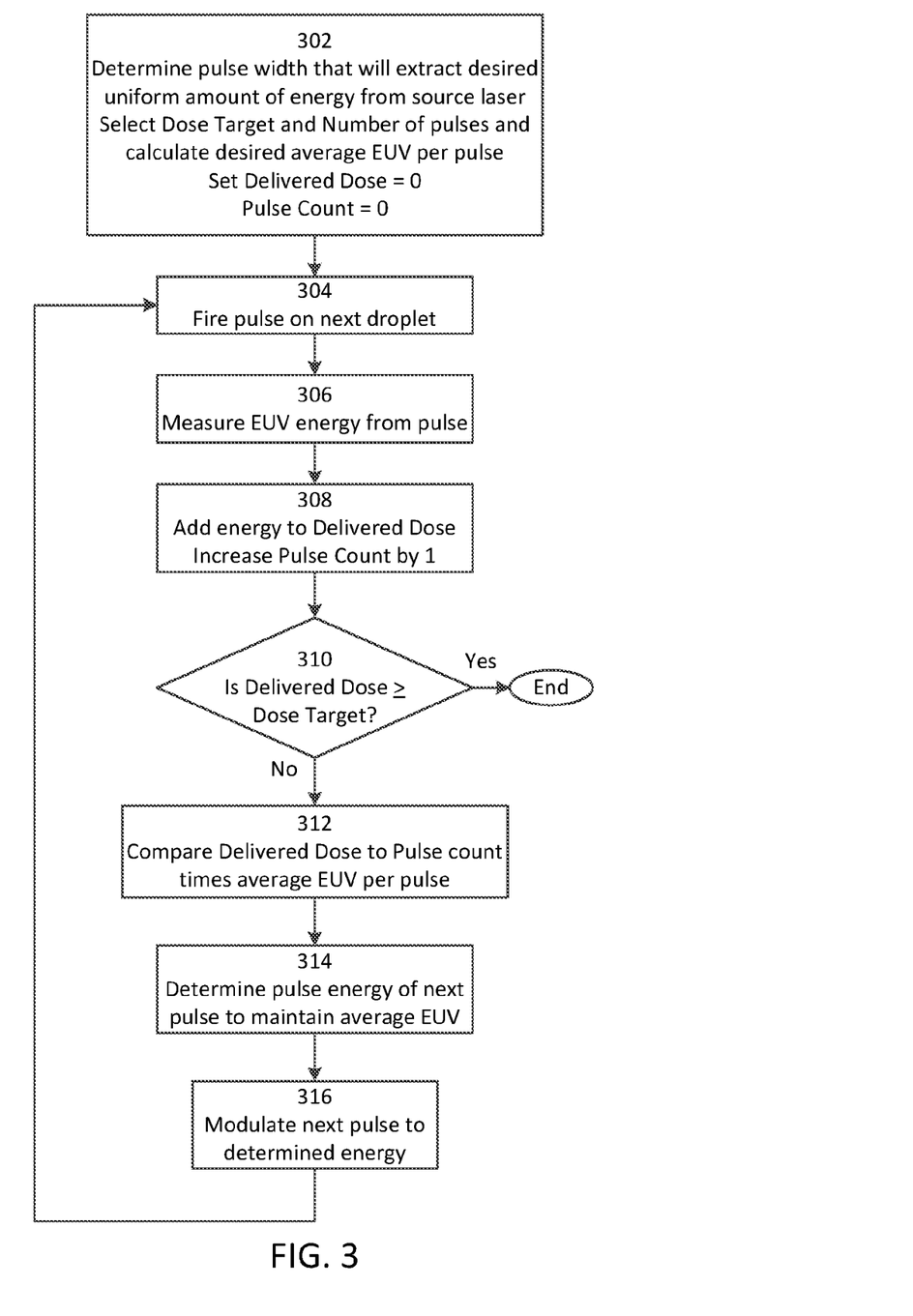
FIG. 3 is a flowchart of a method for improving the control of a dose of EUV radiation generated by an LPP EUV light source according to one embodiment.

FIG. 3 is a flowchart of a method using pulse modulation for dose control in an LPP EUV system according to one embodiment.

At step 302, several values are selected by being received and/or set in a controller, for example, laser controller 111 of FIG. 1, for use in the method. The controller will typically contain, for example, logic or a processor capable of running software, and a memory for storing various values as described herein. The memory may also store program instructions for a processor.

First, a pulse width is determined that is expected to extract a suitable uniform amount of the energy from the source laser gain medium; in some embodiments this will be an amount of energy sufficient to prevent self-lasing. As above, this pulse width may typically be in the range of 100 to 200 ns. The pulse width is often controlled by the use of an EOM; in such a case, the controller may provide instructions to an actuator to cause the EOM to provide a pulse of the desired width.

Additionally, a dose target is chosen for a desired amount of EUV energy that is to be delivered to the object being processed, and a number of pulses over which the dose target is to be delivered. The dose target should be chosen in an amount that will have a desired effect on the object being processed; for example, a dose target might be chosen in an amount that will result in a layer of photoresist applied to a semiconductor wafer being properly exposed.

The number of pulses may be chosen so that an average EUV energy produced per pulse needed to achieve the dose target over the number of pulses is in an amount below the nominal maximum energy per pulse of the system. This allows the average energy per pulse required to obtain the dose target to provide an adequate dose margin. As above, it is desirable that the average energy per pulse not be so low as to cause a large number of missed droplets to be necessary.

The dose target and number of pulses may be selected or input by an operator of the system, or may alternatively be stored in a memory containing appropriate predetermined values for desired operations and retrieved by the controller.

Two more values are used to track the progress of the method. One value is the EUV energy that has been delivered to the object being processed, and is here called "Delivered Dose." Another value is the number of laser pulses that have contributed to Delivered Dose, and is here called Pulse Count. Both Delivered Dose and Pulse Count are initially set to zero.

At step 304, a controller or other logic device, such as laser controller 111 in FIG. 1, causes the laser, such as source laser 101 in FIG. 1, to fire a laser pulse on the next droplet.

At step 306, the EUV energy created by the droplet is measured, for example, by sensor 112 in FIG. 1. If the droplet was hit, there will be some positive value of EUV energy. If the droplet was missed, the value of the energy created will be zero.

At step 308, the controller adds the EUV energy created by the droplet measured at step 306 to the Delivered Dose, and increases the value of Pulse Count by 1.

At step 310 the controller compares Delivered Dose to the value of Dose Target. If Dose Target has been reached, the current process ends and a new process may be commenced upon the same object or a different object as appropriate.

If Dose Target has not been reached, at step 312 the controller compares Delivered Dose to Pulse Count times the average EUV energy per pulse. Thus, the controller determines whether the total EUV energy created so far is greater or less than the number of pulses delivered times the nominal average energy per pulse.

At step 314, the controller determines what the desired EUV energy to be produced by the next pulse should be. It does this by calculating the pulse energy that should result in an expected nominal amount of EUV energy that would result in the next value of Delivered Dose being equal to the next value of Pulse Count times the nominal average energy per pulse.

At step 316 the controller causes the actuator to modulate the next laser pulse to produce the desired EUV energy, and the process returns to step 304 at which the modulated pulse is fired at the next droplet. As above, this modulation is typically performed either by an AOM modulating the magnitude of the laser pulse, or by an RF actuator providing RF energy to the amplifier(s) to alter the amplification of the laser pulse before it strikes a droplet. In some embodiments, the controller will determine which of these two methods, or both, will be used to modulate the laser pulse and command the appropriate actuators to cause such modulation to occur.

It may be seen that in this way the method allows for extraction of a suitable uniform amount of the energy of the laser source, while still allowing for modulation of the laser pulse energy and thus the output EUV power from each laser pulse. The method also keeps track of the total EUV energy that has been delivered to an object from the pulses and adjusts the next pulse to keep the delivered EUV energy on as uniform a schedule as possible. After each pulse, that total EUV energy delivered is compared to the proportion of the dose target that should have been delivered by the proportion of pulses delivered so far.

One of skill in the art will appreciate that the system illustrated in FIG. 1, able to perform either pulse control mode dose control or pulse modulation, may also be used to perform the methods described herein, modified as needed to perform the operations described herein. Sensor 112 still measures the amount of EUV energy from each pulse, and laser controller 111 may be programmed, or logic modified, to perform the steps described above.

It will be apparent to one of skill in the art that the methods and apparatus described herein results in a significant advantage over the prior art. Unlike the EUV pulse modulation dose control of the prior art, in various implementations of the described methods and apparatus the laser source, such as laser source 101, is able to fire so as to provide extraction of a suitable uniform amount of energy from the gain medium while still allowing for a desired amount of EUV energy production. In some embodiments, the uniform amount of energy extracted may be selected so as to prevent self-lasing due to incomplete power extraction and reduce unwanted reflections that may damage optical components.

The disclosed method and apparatus have been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above.

For example, one of skill in the art will appreciate that it will be desirable to extract a different amount of energy with each pulse from a $CO_2$ laser than from a YAG laser; while as little of 5% of the energy from a $CO_2$ laser might be extracted with each pulse, as much as 50% of the energy might be extracted from a YAG laser with each pulse. Similarly, droplet size will vary in different applications, and it will be desirable to vary the length of laser pulses in accordance with the droplet size. However, as above, in the described embodiments, in general the pulse width will be longer than in traditional pulse modulation in order to provide for extraction of a uniform amount of energy from the gain medium.

Different algorithms and/or logic circuits than those disclosed herein may be used. It will be apparent to those of skill in the art that certain steps in the described methods may be performed in a different order or simultaneously; for example, step 316 may be executed substantially simultaneously with step 304, or step 310 may be located elsewhere in the process.

While certain examples have been provided of various configurations, components and parameters, one of skill in the art will also be able to determine other possibilities that may be appropriate for a particular LPP EUV system. Different types of source lasers, sensors, focus lenses and other optics, or other components, or different frequencies of droplets and pulses may be used.

It should also be appreciated that the described method and apparatus can be implemented in numerous ways, including as a process, an apparatus, or a system. The methods described herein may be implemented in part by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. In some embodiments the program instructions may be stored remotely and sent over a network via optical or electronic communication links. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method for controlling a dose of extreme ultraviolet (EUV) radiation generated by a laser produced plasma (LPP) EUV light source, the EUV LPP light source creating EUV energy by firing source laser pulses, a laser pulse having a pulse width corresponding to a nominal amount of laser energy in the pulse, and capable of hitting droplets of target material with a laser pulse, comprising:
   determining, by a controller, the width of a laser pulse necessary to extract a suitable uniform amount of energy with each pulse from a source laser;
   receiving, by the controller, a selected EUV dose target and a number of laser pulses over which the dose target is to be achieved;
   determining, by the controller, a desired average EUV energy per laser pulse to be generated in order to achieve the dose target over the number of laser pulses;
   causing, by the controller, the light source to fire a laser pulse to hit a droplet;
   causing, by the controller, an actuator to modulate the width of the laser pulse to the necessary width;
   measuring, by a sensor, the EUV energy created by the laser pulse hitting the droplet;
   adding, by the controller, the measured EUV energy to a running total of the EUV energy generated by laser pulses that have been fired;
   determining, by the controller, a difference between the running total of the EUV dose and the desired average EUV energy per laser pulse times the number of laser pulses fired and, from the determined difference, a desired EUV energy to be generated by a next laser pulse;

causing, by the controller, the actuator to modulate the pulse energy of the next laser pulse to the suitable pulse energy; and causing, by the controller, the light source to fire the next laser pulse to hit a subsequent droplet.

2. The method of claim 1 wherein the suitable uniform amount of energy to be extracted with each pulse from the source laser is sufficient to prevent self-lasing.

3. The method of claim 1 wherein the actuator is caused to modulate the pulse energy of the next pulse without modulating the pulse width.

4. The method of claim 1 wherein the determined width of the laser pulse to extract the suitable uniform amount of energy from the source laser is between approximately 100 and 200 nanoseconds.

5. The method of claim 4 wherein the actuator comprises an electro-optic modulator.

6. The method of claim 1 wherein the determined width of the laser pulse to extract the suitable uniform amount of energy from the source laser is between approximately 30 and 100 nanoseconds.

7. The method of claim 1 wherein the actuator comprises an electro-optic modulator.

8. The method of claim 1 wherein causing the actuator to modulate the pulse energy of the next laser pulse further comprises causing the actuator to modulate a magnitude of the next laser pulse.

9. The method of claim 1 wherein causing the actuator to modulate the pulse energy of the next laser pulse further comprises causing the actuator to modulate amplification of the next laser pulse by one or more amplifiers in the EUV LPP light source.

10. The method of claim 9 wherein the actuator comprises an RF modulator for applying radio frequency energy to the one or more amplifiers.

11. A system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising:
an actuator configured to modulate the energy of a laser pulse, the pulse energy corresponding to a nominal amount of EUV energy to be produced by the laser pulse;
a sensor configured to measure the EUV energy created by a laser pulse hitting a droplet;
a controller configured to:
determine the width of a laser pulse necessary to extract a suitable uniform amount energy with each pulse from a source laser;
receive a selected EUV dose target and a number of laser pulses over which the dose target is to be achieved;
determine a desired average EUV energy per pulse to be generated in order to achieve the dose target over the number of laser pulses;
cause the light source to fire a laser pulse hit a droplet;
cause the first actuator to modulate the width of the laser pulse to the necessary width;
add the measured EUV energy created by each laser pulse to a running total of the EUV energy generated by laser pulses that have been fired;
determine any difference between the running total of the EUV dose and the desired average EUV energy per pulse times the number of pulses fired and, from the determined difference, and a desired width for a next laser pulse;
cause the actuator to modulate the pulse energy of the next laser pulse to the suitable pulse energy; and
cause the light source to fire the next laser pulse to hit a subsequent droplet.

12. The system of claim 11 wherein the suitable uniform amount of energy to be extracted with each pulse from the source laser is sufficient to prevent self-lasing.

13. The system of claim 11 wherein the actuator is caused to modulate the pulse energy of the next pulse without modulating the pulse width.

14. The system of claim 11 wherein the determined width of the laser pulse to extract the suitable uniform amount of energy from the source laser is between approximately 100 and 200 nanoseconds.

15. The system of claim 14 wherein the actuator comprises an electro-optic modulator.

16. The system of claim 11 wherein the determined width of the laser pulse to extract the suitable uniform amount of energy from the source laser is between approximately 30 and 100 nanoseconds.

17. The system of claim 11 wherein the actuator comprises an electro-optic modulator.

18. The system of claim 11 wherein the controller is further configured to cause the actuator to modulate the pulse energy of the next laser pulse by modulating a magnitude of the next laser pulse.

19. The system of claim 11 further comprising one or more amplifiers for amplifying the laser pulse and wherein the controller is further configured to cause the actuator to modulate the pulse energy by modulating the amplification of the laser pulse by the one or more amplifiers.

20. The system of claim 11 wherein the actuator comprises an RF modulator for applying radio frequency energy to the one or more amplifiers.

21. A non-transitory computer readable storage medium having embodied thereon instructions for a method of controlling a dose of extreme ultraviolet (EUV) radiation generated by a laser produced plasma (LPP) EUV light source, the EUV LPP light source creating EUV energy by firing source laser pulses, a laser pulse having a pulse width corresponding to a nominal amount of laser energy in the pulse, and capable of hitting droplets of target material with a laser pulse, the method comprising:
determining, by a controller, the width of a laser pulse necessary to extract a suitable uniform amount of energy with each pulse from a source laser;
receiving, by the controller, a selected EUV dose target and a number of laser pulses over which the dose target is to be achieved;
determining, by the controller, a desired average EUV energy per laser pulse to be generated in order to achieve the dose target over the number of laser pulses;
causing, by the controller, the light source to fire a laser pulse to hit a droplet;
causing, by the controller, an actuator to modulate the width of the laser pulse to the necessary width;
measuring, by a sensor, the EUV energy created by the laser pulse hitting the droplet;
adding, by the controller, the measured EUV energy to a running total of the EUV energy generated by laser pulses that have been fired;
determining, by the controller, a difference between the running total of the EUV dose and the desired average EUV energy per laser pulse times the number of laser pulses fired and, from the determined difference, a desired EUV energy to be generated by a next laser pulse;

causing, by the controller, the actuator to modulate the pulse energy of the next laser pulse to the suitable pulse energy; and causing, by the controller, the light source to fire the next laser pulse to hit a subsequent droplet.

* * * * *